(12) United States Patent
Fowler et al.

(10) Patent No.: US 9,076,265 B2
(45) Date of Patent: Jul. 7, 2015

(54) SYSTEM AND METHOD FOR PERFORMING DEPTH TESTING AT TOP AND BOTTOM OF GRAPHICS PIPELINE

(75) Inventors: Mark Fowler, Markham (CA); Chris Brennan, Markham (CA)

(73) Assignee: ATI TECHNOLOGIES ULC, Markham, Ontario (CA)

( * ) Notice: Subject to any disclaimer, the term of this patent is extended or adjusted under 35 U.S.C. 154(b) by 487 days.

(21) Appl. No.: 11/454,267

(22) Filed: Jun. 16, 2006

(65) Prior Publication Data
US 2007/0291030 A1    Dec. 20, 2007

(51) Int. Cl.
*G06T 15/40*    (2011.01)
(52) U.S. Cl.
CPC .................................. *G06T 15/405* (2013.01)
(58) Field of Classification Search
None
See application file for complete search history.

(56) References Cited

U.S. PATENT DOCUMENTS

| | | | | |
|---|---|---|---|---|
| 5,363,475 | A | 11/1994 | Baker et al. | |
| 6,313,839 | B1* | 11/2001 | Larson | 345/422 |
| 6,317,124 | B2* | 11/2001 | Reynolds | 345/422 |
| 7,068,272 | B1* | 6/2006 | Voorhies et al. | 345/422 |
| 2004/0061699 | A1* | 4/2004 | Tjew | 345/421 |
| 2005/0122338 | A1* | 6/2005 | Hong et al. | 345/546 |
| 2005/0195198 | A1* | 9/2005 | Anderson et al. | 345/506 |

OTHER PUBLICATIONS

Guha, S., Krishnan, S., Munagala, K., Venkatasubramanian, S., Application of the two-sided depth test to CSG rendering, Apr. 2003, Proceedings of the 2003 symposium on Interactive 3D graphics, pp. 177-180, 249.*

Airey, J.M., et al., "Towards image realism with interactive update rates in complex virtual building environments", Silicon Graphics Computer Systems, 1990, pp. 41-50 and 258.

Hubschman, H., et al., "Frame-to-frame coherence and the hidden surface computation: constraints for a convex world", SIGGRAPH '81, 8$^{th}$ Conference on computer graphics and interactive techniques, Aug. 3-7, 1981, Dallas, TX, pp. 129-162.

Atherton, P., et al., "Polygon shadow generation", Program of computer graphics, Cornell University, pp. 275-281, Aug. 1978.

Salesin, D., et al., "The ZZ-buffer: a simple and efficient rendering algorithm with reliable antialiasing", Proceedings of PIXIM 89, Sep. 1989, pp. 451-466.

Nishita, T., et al., "Continuous tone representation of three-dimensional objects taking account of shadows and interreflection", ACM, 1985, SIGGRAPH '85pp. 23-30.

Forrest, A.R., "On the rendering of surfaces", ACM 1979, pp. 253-259.

(Continued)

*Primary Examiner* — Said Broome
(74) *Attorney, Agent, or Firm* — Volpe and Koenig, P.C.

(57) ABSTRACT

Embodiments of a system and method including graphics processing of a pixel sample are described. According to an embodiment, a first depth test processes a value, such as a z/stencil value, of a pixel sample and determines whether the value of the pixel sample satisfies the first depth test. If the value of the pixel sample satisfies the first depth test, the value of the pixel sample is not immediately written to storage, such as a Z-buffer. That is, if the value of the pixel sample satisfies the first depth test, the depth processing logic prevents or delays a write operation for the value of the pixel sample to storage at that time. A second depth test is performed on the value of the pixel sample if the value of the pixel sample satisfied the first depth test. If the value of the pixel sample satisfies the second depth test, the value of the pixel sample is then written to storage.

17 Claims, 4 Drawing Sheets

(56) References Cited

OTHER PUBLICATIONS

Rossignac, J.R., et al., "Depth-buffering display techniques for constructive solid geometry", IEEE Computer graphics and applications, vol. 6, No. 9, Sep. 1986, pp. 29-39.

Crocker, G.A., "Invisibility coherence for faster scan-line hidden surface algorithms", SIGGRAPH 1984, pp. 95-102.

Greene, N., et al., "Hierarchical Z-buffer visibility", ACM 1993, pp. 1-7.

Durand, F., et al., "Conservative visibility preprocessing using extended projections", SIGGRAPH 2000. pp. 1-13.

Nishita, T., et al., "Continuous tone representation of three-dimensional objects illuminated by sky light", ACM 1986, SIGGRAPH '86, vol. 20, No. 4, pp. 125-132.

* cited by examiner

SYSTEM AND METHOD FOR PERFORMING DEPTH TESTING AT TOP AND BOTTOM OF GRAPHICS PIPELINE

BACKGROUND

Today's graphics processing systems can process and present complex three-dimensional (3D) objects and scenes in what seems like real-time to a system user. The demand for computer-generated animation in television and movies, virtual reality devices, and immersive computer games has accelerated graphics application development. Consequently, the high resolution and quality of many modern graphics applications require high performance graphics processing systems and components. Graphics design engineers are constantly looking for new procedures that can accelerate graphics processing while also reducing the load on a graphics processing system.

Graphics designer engineers attempt to increase processing speed by determining whether an object or a portion thereof is not an important feature in an image. For example, graphics processing systems utilize z and stencil (also referred to as depth and stencil or sometimes collectively as "depth") processing techniques to determine if an object is occluded or not visible in a scene. If the object or pixel is determined to be occluded, further processing may be avoided, which helps to speed up processing time. That is, depth operations may be performed before performing other pixel processing operations.

However, even if a depth operation is performed early in the processing timeline, other tests, such as alpha-tests etc., may still delete a pixel that passed the early depth operation. In such cases, an early depth operation may not be enabled if the rendering state is such that using the early depth operation could lead to incorrect results. For example, suppose that a pixel sample satisfies an early depth test and a new z-value replaces an old z-value associated with the pixel sample. If the pixel sample is later deleted, after an alpha test for example, then the z-value that was replaced due to the early depth operation should not have been replaced. Thus, it is possible that subsequent graphics processing operations may use a wrong z-value, which may result in erroneous image rendering. In cases where an early depth test may lead to such circumstances, traditional depth testing may be used.

Traditional depth testing typically occurs during a later stage of a pixel processing pipeline. For example, a traditional depth test is implemented after shader processing operations. Moreover, the traditional depth test may result in wasted processing time and adversely impact bandwidth. For example, a number of pixels may still be discarded after having been textured, alpha-tested/blended, etc., which results in wasted processing operations, unnecessary bandwidth usage, and a slower rendering time. Additionally, valuable processing bandwidth may have been imprudently provisioned to pixels which are ultimately discarded as a result of the traditional depth test.

DETAILED DESCRIPTION

Embodiments of a system and method in which graphics processing of a pixel sample are described. Embodiments perform a first depth test on a value, such as a z/stencil value, of a pixel sample and determine whether the pixel sample satisfies the first depth test. If the pixel sample satisfies the first depth test, the value of the pixel sample is not immediately written to storage, such as a Z-buffer or other memory. That is, if the value of the pixel sample satisfies the first depth test, the depth processing logic prevents or delays a write operation for the value of the pixel sample at that time. After further processing of the pixel sample, a second depth test is performed on the value of the pixel sample if the value of the pixel sample satisfied the first depth test. If the value of the pixel sample satisfies the second depth test, the value of the pixel sample is then written to storage, such as a Z-buffer or other memory. Otherwise, the pixel sample may be culled and the processing of a next pixel sample proceeds.

The system and method may save bandwidth and increase processing time by efficiently processing pixel samples by discarding pixel samples that are known to fail the depth test before the work of shader processing is performed but still allowing a more accurate depth test to occur when such a test is proper. According to an embodiment, the processing method uses depth testing logic to determine whether a pixel sample is written to a Z-buffer or other memory. The depth testing logic may determine distances associated with every rendered pixel sample from a viewpoint or associated with a field of view for example. The distances may be stored in storage, such as Z-buffer (depth buffer) or other memory, and then used to determine which pixel samples may be occluded or visible for example. The system and method may operate to render objects quicker and more efficiently by reducing the number of pixel samples for display and involved in operations using the Z-buffer which may improve the image processing experience.

Figure 1:
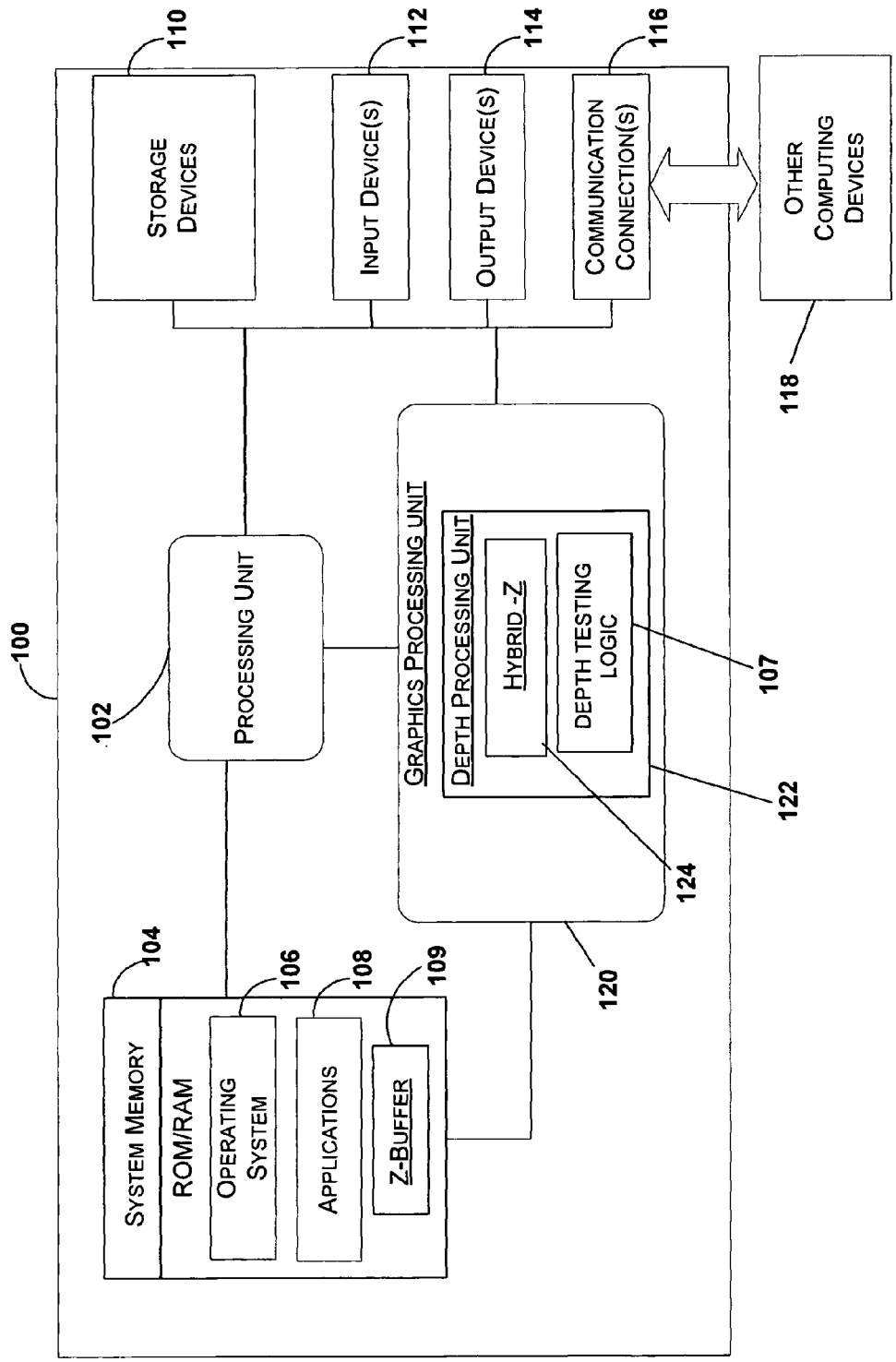
FIG. 1 is a block diagram of computing system including a graphics processing unit (GPU) having a depth processing unit including hybrid depth testing functionality, according to an embodiment.

FIG. 1 is a block diagram illustrating components of a computing device 100, according to an embodiment. The computing device 100 includes any computing system, such as a handheld computer or personal digital assistant, a mobile computing system, a desktop computing system, a laptop computing system, a graphics-specific computing system, and other computing systems. The computing device 100 typically includes at least one processing unit 102 and system memory 104. Depending on the configuration and type of computing device, system memory 104 may be volatile (such as random access memory (RAM), non-volatile (such as read-only memory (ROM), flash memory, etc.) or some combination of volatile and non-volatile types.

The system memory 104 can include an operating system 106, and one or more applications 108, such as a graphics application. For example, a graphics application can execute on the processing unit 102 to generate commands and graphics data. The graphics data may define geometric primitives such as polygons, etc. for output on a display device. According to an embodiment, the system memory 104 includes a depth buffer or Z-buffer 109 for storing z-values of pixel samples, as further described below. The Z-buffer 109 is typically a large array of memory having a depth entry for each pixel in a frame buffer 210 (see FIG. 2). In alternative embodiments, the Z-buffer 109 may be included as part of the GPU 120 or depth processing unit 122. In another embodiment, the system memory 104 includes more than one Z-buffer 109.

Computing device 100 may also include additional computer storage devices 110, for example, magnetic storage devices, optical storage devices, etc. Computer storage devices include, but are not limited to, RAM, ROM, (electrically-erasable programmable read-only memory (EEPROM), flash memory or other memory technology, optical storage, magnetic cassettes, magnetic tape, magnetic disk storage or other magnetic storage devices, or any other medium which can be used to store information. Computing device 100 may also include one or more input devices 112 and one or more output devices 114. Computing device 100 may also contain communication connections 116 that allow the device 100 to communicate with other computing devices 118 and systems, such as over a wireline and/or wireless network or other network.

The computing device 100 includes a graphics processing unit (GPU) 120. While GPU 120 is shown to be part of computing system 100, the GPU 120 may be configured as a stand-alone device including a display, such as a handheld computing device with graphics capabilities. Moreover, GPU 120 may be configured as a single chip device or as part of a system-on-a-chip or a multi-chip device. In various embodiments, the processing operations performed by components of the GPU 120 may be implemented in software, firmware, hardware, or a combination thereof.

According to an embodiment, the GPU 120 includes a depth processing unit 122. The depth processing unit 122 may be used to process pixel samples according to the visible (or occluded) status of the pixel samples. The depth processing unit 122 is in communication with the Z-buffer 109. As described above, in certain embodiments, the GPU 120 and/or depth processing unit 122 can include a Z-buffer 109 for maintaining depth information associated with pixel samples. The GPU 120 may use the depth processing unit 122 to determine whether a pixel sample is within a desired field of view or occluded. The depth processing unit 122 operates on z-values of pixel samples and may write z-values of pixel samples to the Z-buffer 109 or other storage under various circumstances described below. The depth processing unit 122 may also read and/or modify z-values of pixel samples stored in the Z-buffer 109 or other storage. For example, a z-value may be stored in the Z-buffer 109 which represents a distance from a viewpoint for a particular pixel.

The depth processing unit 122 processes pixel samples in accordance with depth testing logic 107 to determine whether to cull a pixel sample or further process the pixel sample. In an embodiment, the depth processing unit 122 includes programmable depth testing logic 107 for evaluating z-values of pixel samples. The result of the evaluation may be used in determining whether to further process a particular pixel sample. The depth testing logic 107 may be programmed to apply various operations when evaluating z-values of a pixel sample, such as between a current z-value and a prior z-value stored in the Z-buffer 109.

For example, the programmed depth testing logic 107 may be used to apply various depth tests during a visibility or occlusion determination to evaluate z-values according to various conditions, such as less than (<), greater than (>), equal to (=), less than or equal to (<=), greater than or equal to (>=), always, never, etc. In an embodiment, the depth processing unit 122 may update the Z-buffer 109 or other storage with a new z-value, based on the result of the evaluation. For example, a stored z-value may represent a visible pixel having the lowest z-value according to logic implemented in the depth processing unit 122. Thus, the z-value of the pixel sample stored in the Z-buffer 109 may be updated to represent a new z-value of a rendered pixel, based on an evaluation by the depth processing unit 122.

In an embodiment, and as described further below, the depth processing unit 122 includes hybrid-z functionality 124 for testing z-values of pixel samples. The depth processing unit 122 may use the hybrid-z functionality 124 to initially test a z-value of a pixel sample and pass the pixel sample to other stages of a pixel processing pipeline for further processing if it passes the initial test. However, the hybrid-z functionality 124 prevents or delays the z-value from being written to storage, such as a Z-buffer or other memory, before processing the pixel sample further with other stages of the pixel processing pipeline.

The hybrid-z functionality 124 allows the depth processing unit 122 to further evaluate the z-value with depth testing logic 107 if the pixel sample survives various stages of the processing pipeline. The hybrid-z functionality 124 may improve the amount of processing by preventing samples from being processed that pass an initial depth test, but ultimately are discarded due by another process in the pipeline. Stated differently, the hybrid-z functionality 124 prevents an early z-value write operation associated with a pixel sample if other stages in the processing pipeline may ultimately discard the pixel sample. In cases where the Z-buffer 109 is too large to store locally, buffered values can also be written to and/or retrieved from other storage (e.g. on-board RAM, on-chip RAM, local cache, system RAM, etc.).

Figure 2:
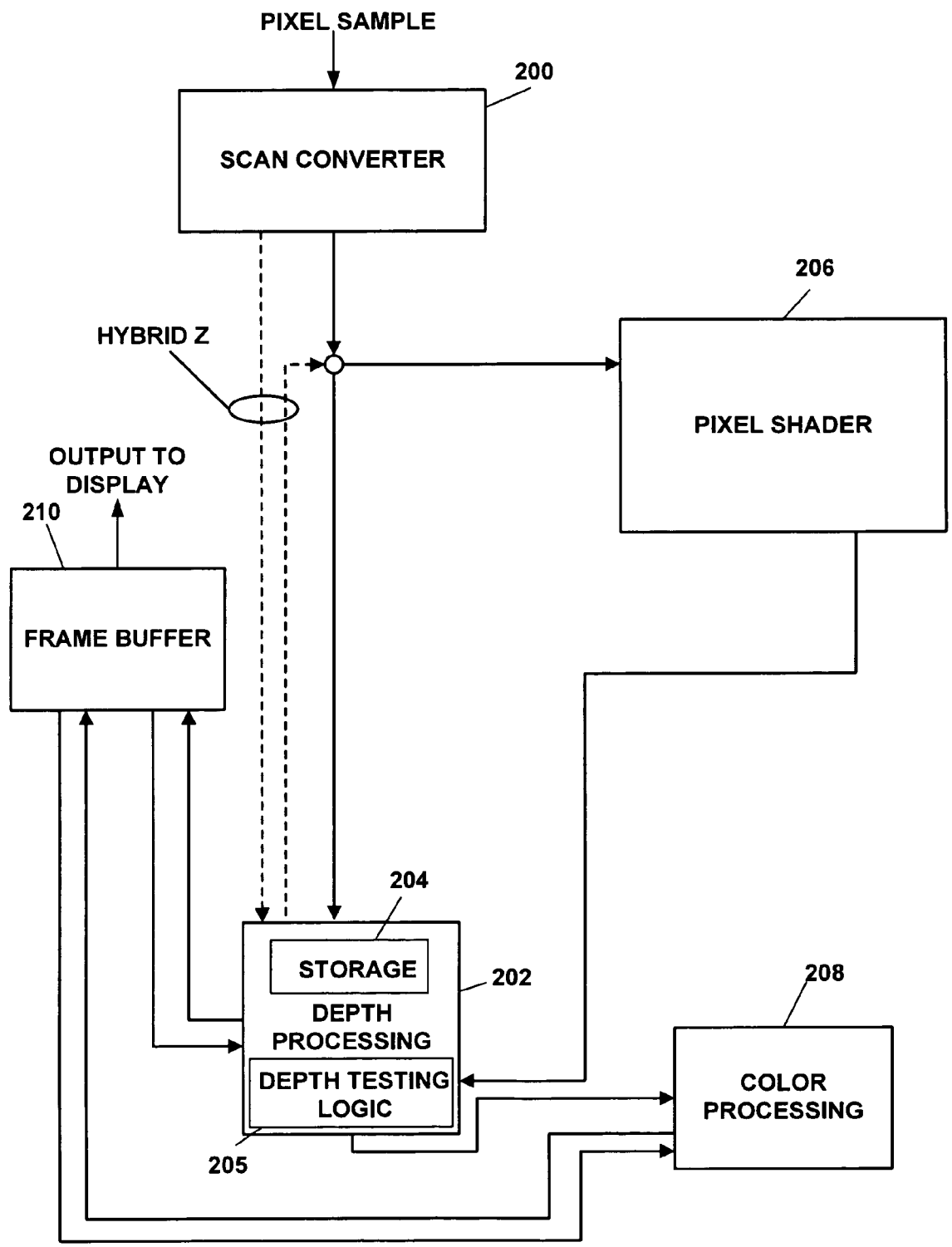
FIG. 2 is a block diagram which illustrates graphics processing components used in processing of pixel samples, according to an embodiment.

FIG. 2 is a block diagram which illustrates a number of graphics processing components used in the processing of pixel samples in accordance with an embodiment. While a number of graphics processing components are described below, other embodiments may include more or fewer processing components. The various components depicted in FIG. 2 can be implemented as part of a GPU, such as GPU 120 of FIG. 1. As shown in FIG. 2, a pixel sample is passed to a scan converter 200 from a set-up engine (not shown). The set-up engine may operate to map primitives to a (3D) view. The mapping typically involves translating and transforming objects to an established viewpoint or field of view. For example, the set-up engine may create a perspective for displaying 3D objects on a display.

The scan converter 200 produces pixel-related information from the received pixel sample. For example, the scan converter may produce pixel coordinate data, such as x, y, and z coordinate data, and barycentric data, such as color data associated with a vertex of the pixel sample. As described below, the depth information, typically represented as a z-coordinate data or z-value of a pixel sample, is used to determine whether a pixel sample is visible or occluded. The scan converter 200 may also produce other pixel sample information depending on a particular implementation.

With continuing reference to FIG. 2, the data associated with the pixel sample is output from the scan converter 200 and input to a depth processing block 202. The depth processing block 202 may include other storage 204, such as a cache memory for storing z-value data. The cache memory may also hold stencil and other data. The depth processing block 202 also includes depth testing logic 205 in the form of arithmetic operators and other instructions which operate to perform various tests on pixel samples and to update the storage 204 based on the outcome of a desired test. The depth processing block 202 is also configured to cull pixel samples that do not satisfy the depth testing logic 205. The processing of the pixel sample data using the depth processing block 202 is described below. While one processing configuration is shown in FIG.

2, other processing configurations are available and depend on a particular pixel processing implementation.

According to an embodiment, pixel sample data may be input to a pixel shader 206 for further processing enhancements based on the results of the depth processing block 202 on the pixel sample data. The pixel shader 206 may execute a program consisting of math operations, texture operations, and/or other operations/instructions on received pixel sample data. For example, the pixel shader 206 may be configured to provide smoothing operations, blending operations, dithering operations, transparency operations, and/or bump mapping, but is not so limited. The particular operations of pixel shader 206 may depend upon a current implementation/configuration, such as current values of a set of state variables associated with the pixel shader 206.

The pixel shader 206 is sometimes referred to as being "short" or "long." For example, a "short" pixel shader may refer to a pixel shader configured to provide one or two enhancements, such as smoothing and/or dithering operations, to a pixel sample; while a "long" pixel shader may refer to a pixel shader configured to provide more than two enhancements, such as smoothing, blending, and transparency operations, to a pixel sample. The pixel shader 206 may be configured to output enhanced pixel sample data which again may be provided to the depth processing block 202 (see FIG. 2), in accordance with an embodiment. Based on the results of the depth processing block 202, the enhanced pixel sample data may be output to a color processing block 208. The color processing block 208 may be configured to apply color processing operations to the enhanced pixel sample. The color processing block 208 may also blend color data output from the pixel shader 206 with color data that may already exist in the frame buffer 210. The pixel data residing in the frame buffer 210 may then be output to a display.

Figure 3:
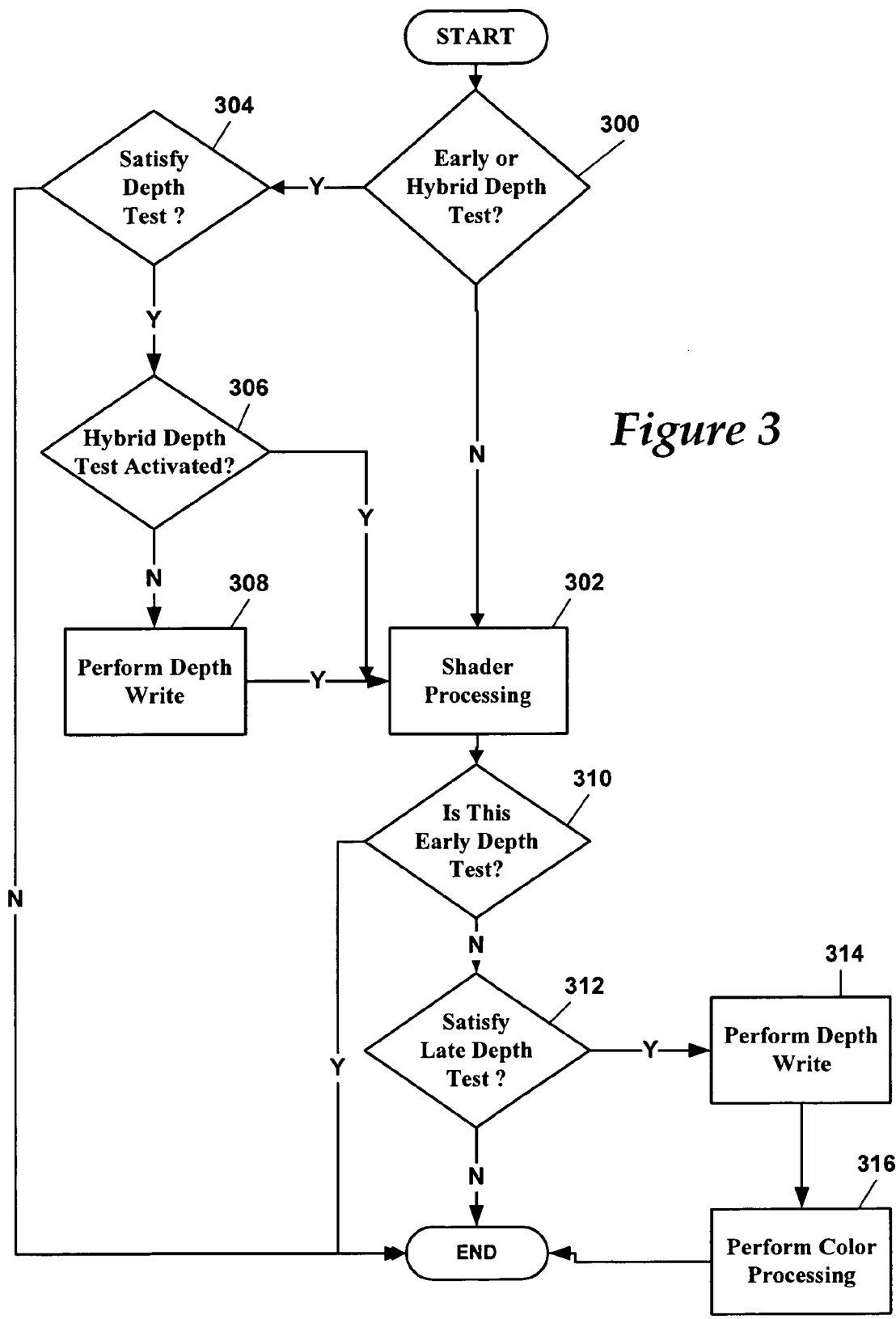
FIG. 3 is a flow diagram of pixel sample processing, according to an embodiment.

FIG. 3 is a flow diagram of pixel sample processing, according to an embodiment. FIGS. 1 and 2 will be used to assist in the description of the flow of FIG. 3. The pixel sample processing flow of FIG. 3 begins at 300 with determining whether an early depth operation or a hybrid depth operation is activated. An early depth operation refers to a depth operation that occurs early in the pixel processing pipeline, such as before operations provided by the pixel shader 206. According to an embodiment, an early depth operation refers to the depth testing and writing of z/stencil values of pixel samples without performing a late or subsequent depth operation if a pixel sample satisfies the depth testing logic 205 associated with the current implementation of the depth processing block 202.

A hybrid depth operation refers to a depth test that not only occurs early in the pixel processing pipeline, but also may occur later in the pixel processing pipeline based on the results of an initial depth test and/or other pixel pipeline operations. According to an embodiment, as described below, the hybrid depth operation does not update the Z-buffer 109 with a new z-value if the pixel sample satisfies the depth testing logic 205 of an initial depth test (at 304), but may after the pixel processing pipeline if needed. A late depth operation (sometimes referred to as a traditional depth operation) refers to the depth testing of z-values of pixel samples later in the pixel processing pipeline, such as after operations of the pixel shader 206.

The activation of one or more of the various depth tests may be based on the values of one or more register bits associated with the depth processing unit 122 or depth processing block 202, but is not so limited. For example, a software driver, such as a graphics application driver for example, may be used to program the depth processing unit 122 to perform certain depth testing operations according to certain preferences, such as a pixel pipeline state structure, pixel shader implementation, etc. For example, a graphics application may set various logical modes of the depth processing unit 122 or depth processing block 202 based on the length or states of the pixel shader relative to any performance impact that may occur by using the different modes.

For example, a programmed logic "0" may set the depth processing unit 122 to only perform late depth testing on pixel samples. A programmed logic "1" may set the depth processing unit 122 to perform an early depth test, or a late depth test when the early depth test may lead to incorrect results. A programmed logic "2" may set the depth processing unit 122 to perform a hybrid depth test, or a late depth test when the hybrid depth test may lead to incorrect results. A programmed logic "3" may set the depth processing unit 122 to perform a hybrid depth test, then an early depth test or a late depth test when the hybrid depth test may lead to incorrect results. The depth processing unit 122 also may include an override bit that forces a logic "0" as a fallback mode when the hardware and/or software configuration is not sound.

The depth processing unit 122 may also be configured to adjust from one test mode to another depending on the operational state(s) of certain graphics processing components. For example, the depth processing unit 122 may transition from an early depth test to a hybrid depth test if the depth processing unit 122 is unable to write to the Z-buffer 109 due to certain circumstances, such as when a pixel shader has kill instructions, an alpha-test is activated, an alpha-to-coverage process is activated, etc. For example, when enabled, an alpha-to-coverage process may use a 0.0 to 1.0 alpha value as a percentage covered amount, and kill a number of pixel samples based on the associated percentage covered amount. Accordingly, further processing of a pixel sample may be erroneous if the pixel sample is later killed after an early write. As another example, the depth processing unit 122 may transition from an early depth test to a late depth test if the depth processing unit 122 is unable to perform the early test due to certain circumstances, such as due to a z-export processing. Z-export processing refers to a pixel shader operation wherein an arbitrary z-value is used instead of a z-value for a pixel sample that issued from the scan converter 200 for example. If the arbitrary z-value exported from the pixel shader 206 is different than the z-value associated with the pixel sample, then the early depth test performed before processing by the pixel shader 206 may produce an erroneous result.

As described above, the depth processing unit 122 or depth processing block 202 can be configured to operate according to certain modes. With continuing reference to FIG. 3, if neither the early depth test nor the hybrid depth test is activated, at 302, the pixel sample is sent to the pixel shader 206 for shader processing as described above. If the early depth test or hybrid depth test is activated, at 304, the depth processing block 202 evaluates the z-value of the pixel sample according to the depth testing logic 205, as implemented. The depth testing logic 205 may be programmed to apply various operations when evaluating z-values of pixel samples, such as between a current z-value and a prior z-value stored in the cache 204 or Z-buffer 109. For example, the depth testing logic 205 may be used to apply various depth tests during a visibility or occlusion determination to evaluate a z-value of a pixel sample according to various conditions, such as less than ($<$), greater than ($>$), equal to ($=$), less than or equal to ($<=$), greater than or equal to ($>=$), always, never, etc. As an example, if the depth testing logic 205 applies a less than test between a current z-value and a prior z-value, the depth test is satisfied if the current z-value is less than the prior z-value.

According to an embodiment, if a z-value of the pixel sample does not satisfy an implemented depth test according to depth testing logic 205, the depth processing block 202 may cull the pixel sample, but is not so limited. That is, no further processing of the pixel sample occurs and the next pixel sample is examined. If the pixel sample satisfied the depth test at 304, then at 306 the depth processing block 202 determines whether the hybrid depth test is activated. If the hybrid depth test is not activated, at 308, the z-value of the pixel sample is written to the Z-buffer 109 and a late depth test is not performed on the pixel sample. The pixel sample is then sent to the pixel shader 206 for shader processing at 302.

If the hybrid depth test is activated, at 309, the z-value of the pixel sample is not written to the Z-buffer 109. The old z-value may be saved to storage 204 or refetched as necessary. Saving the old z-value of the pixel sample to storage may speed up the processing of the pixel sample, since operations involving the Z-buffer 109 may take longer and use additional bandwidth. Then, at 302, the pixel sample is processed by the pixel shader 206. That is, activation of the hybrid depth test prevents or delays the early writing of the z-value of the pixel sample to the Z-buffer 109 if the pixel sample satisfies the depth test at 304. However, further processing of the pixel sample continues as shown in FIG. 3.

At 310, the flow proceeds with the depth processing block 202 determining whether the early depth test is activated. If the early depth test is activated, the flow ends. If the early depth test is not activated (the hybrid test is activated), the depth processing block 202 determines if the z-value of the pixel sample satisfies a late depth test at 312. If the z-value of the pixel sample satisfies the late depth test, at 314 the z-value of the pixel sample is written to the Z-buffer 109, overwriting the z-value currently in the Z-buffer 109.

At 316, the pixel sample is sent to the color processing block 208 for further processing, as described above. If the z-value of the pixel sample does not satisfy the late depth test, the depth processing block 202 may cull the pixel sample, but is not so limited. That is, further processing of the current pixel sample ends and a next pixel sample examined. In an embodiment, the depth processing block 202 may use the depth testing logic 205 to implement the same testing conditions for the depth test at 304 and the late depth test at 312. In another embodiment, the depth processing block 202 may use depth testing logic 205 to implement a first testing condition for the depth test at 304 and a second testing condition for late depth test at 312. Other combinations are also available according to a desired implementation.

Figure 4:
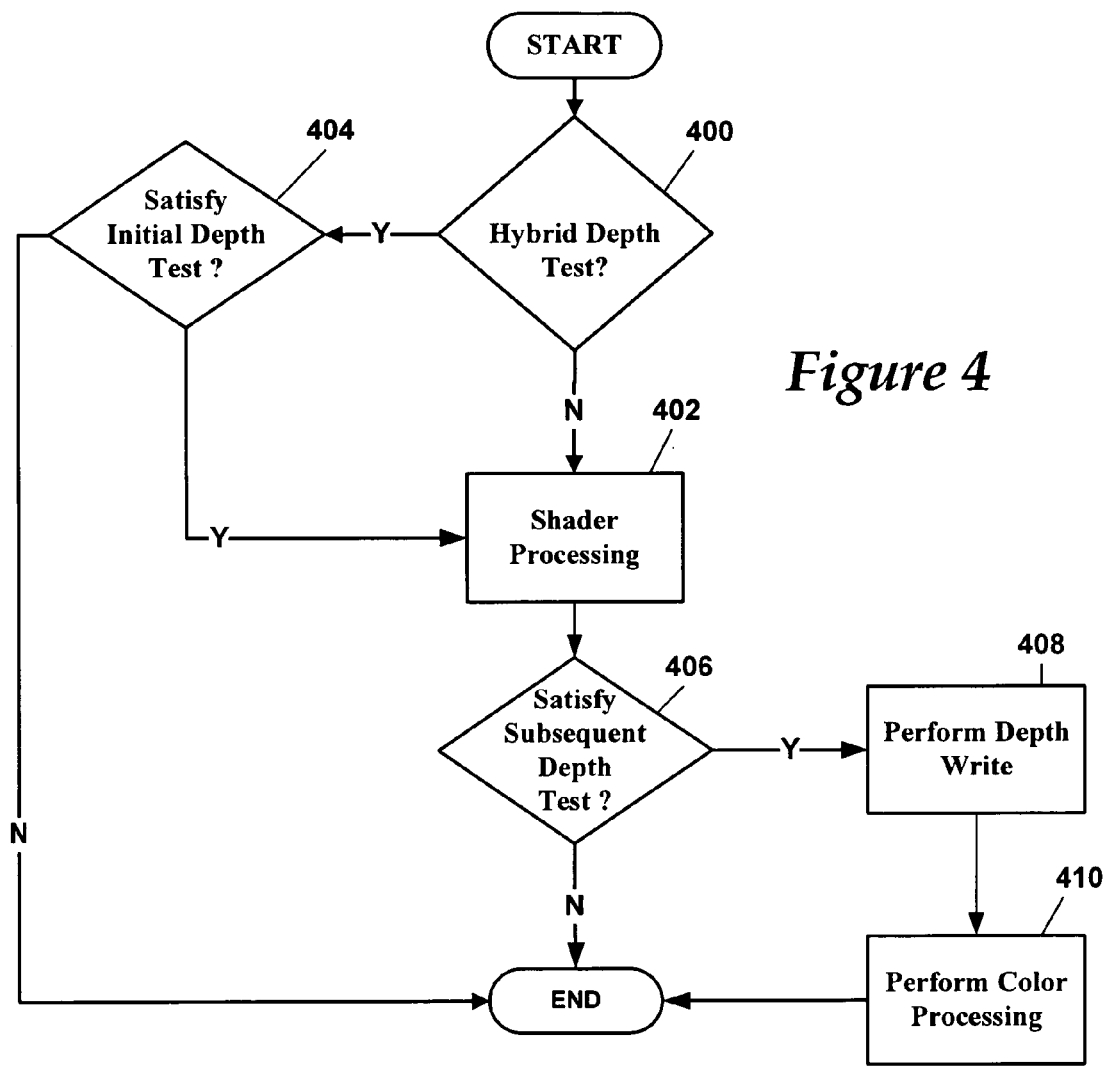
FIG. 4 is a flow diagram of pixel sample processing, according to an embodiment.

FIG. 4 is a flow diagram of pixel sample processing, according to another embodiment. FIGS. 1 and 2 will be used again to assist in the description of the flow of FIG. 4. The pixel sample processing flow of FIG. 4 begins at 400 with determining whether a hybrid depth test is activated. In an embodiment, the activation of the hybrid depth test is based on the particular implementation associated with the depth processing unit 122 or depth processing block 202, as described above. The hybrid depth test refers to both initial and subsequent depth testing of a z-value of a pixel sample if the z-value of the pixel sample satisfies the initial depth test.

The initial depth test refers to a depth test that occurs early in the pixel processing pipeline, such as before operations provided by the pixel shader 206 and/or color processing block 208, but is not so limited. According to an embodiment, an initial depth test refers to the depth testing of z-values of pixel samples without performing a late or subsequent depth test if a z-value of a pixel sample satisfies the depth testing logic 205 associated with the current implementation of the depth processing block 202. The subsequent depth test refers to a depth test that occurs later in the pixel processing pipeline, such as after operations provided by the pixel shader 206, but is not so limited. In an embodiment, the subsequent depth test refers to the depth testing of z-values of pixel samples later in the pixel processing pipeline, such as after operations performed by the pixel shader 206.

If the hybrid depth test is not activated, at 402 the pixel sample is sent to the pixel shader 206 for shader processing. If the hybrid depth test is activated, at 404 the depth processing block 202 determines if the z-value of the pixel sample satisfies the initial depth test. If the z-value of the pixel sample does not satisfy the initial depth test, the depth processing block 202 may cull the pixel sample, but is not so limited. That is, the pixel sample may be ignored and a next pixel sample examined. If the z-value of the pixel sample satisfies the initial depth test, at 402 the pixel sample is sent to the pixel shader 206 for shader processing.

If the hybrid depth test is activated and the z-value of the pixel sample satisfied the initial depth test, the z-value of the pixel sample is not written to the Z-buffer 109. That is, implementation of the hybrid depth test prevents or delays an early writing of the z-value of the pixel sample to the Z-buffer 109 if the z-value of the pixel sample satisfies the initial depth test. At 406, the depth processing block 202 determines if the z-value of the pixel sample satisfies the subsequent depth test. If the z-value of the pixel sample satisfies the subsequent depth test, at 408 the z-value of the pixel sample is written to the Z-buffer 109, and thereby overwriting the z-value currently in the Z-buffer 109.

At 410, the pixel sample is sent to the color processing block 208 for further processing, as described above. If the z-value of the pixel sample does not satisfy the subsequent depth test, the depth processing block 202 may cull the pixel sample. In an embodiment, the depth processing block 202 may use the depth testing logic 205 to implement similar testing conditions for both the initial and the subsequent depth tests. In another embodiment, the depth processing block 202 may use depth testing logic 205 to implement a testing condition for the initial depth test and a different testing condition for the subsequent depth test. Other combinations are also available according to a desired implementation.

Embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing embodiments include: microcontrollers with memory (such as electronically erasable programmable read only memory (EEPROM)), embedded microprocessors, firmware, software, etc. Furthermore, embodiments may be implemented in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments is not intended to be exhaustive or limited by the disclosure. While specific embodiments of, and examples are described herein for illustrative purposes, various equivalent modifications are possible, as those skilled in the relevant art will recognize. The teachings provided herein can be applied to other systems and methods, and not only for the systems and methods described above. The elements and acts of the various embodiments described above can be combined to provide further embodiments. These and other changes can be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. For example, while only one aspect is recited as embodied in machine-readable medium, other aspects may likewise be embodied in machine-readable medium. Accordingly, the inventors reserve the right to add additional claims after filing the application to pursue such additional claim forms for other aspects as well.

What is claimed is:

1. A computer implemented graphics processing method for processing graphics data to produce electronic data for use in generating an electronic image, the method comprising:
   performing an initial depth test on a pixel sample without updating a depth value of the pixel sample on a condition that the initial depth test is satisfied;
   processing the pixel sample using shader hardware and software of a graphics processing pipeline if the initial depth test is determined to be satisfied;
   performing a subsequent depth test on the processed pixel sample after performing the initial depth test and the processing; and
   writing the depth value of the pixel sample to storage after performing the subsequent depth test if the subsequent depth test is determined to be satisfied.

2. The method of claim 1, further comprising culling the pixel sample if the initial depth test is not satisfied.

3. The method of claim 1, further comprising culling the pixel sample if the subsequent depth test is not satisfied.

4. The method of claim 1, further comprising processing the pixel sample with additional enhancements if the depth value of the pixel sample satisfies the initial depth test.

5. The method of claim 4, further comprising processing the pixel sample with a pixel shader to enhance the pixel sample.

6. The method of claim 1, further comprising delaying the writing of the depth value of the pixel sample to storage if the initial depth test is satisfied.

7. The method of claim 1, further comprising performing color processing on the pixel sample if the pixel sample satisfies the subsequent depth test.

8. A graphics processing system, the system comprising:
   a Z-buffer for storing depth values associated with depth information of pixel samples;
   a depth processing unit which is configured to:
   perform a first depth test on a depth value of a pixel sample based on at least one register bit indicative of a depth testing schema without updating the depth value of the pixel sample in the Z-buffer on a condition that the initial depth test is satisfied;
   perform a second depth test on the depth value of the pixel sample if the depth value of the pixel sample satisfies the first depth test; and
   store the depth value of the pixel sample in the Z-buffer if the depth value of the pixel sample satisfies the second depth test; and
   a pixel shader in communication with the depth processing unit, the pixel shader configured to enhance the pixel sample with enhancement operations if the depth value of the pixel sample satisfies the first depth test.

9. The system of claim 8, wherein the depth processing unit is further configured to cull the pixel sample if the depth value of the pixel sample does not satisfy the first depth test.

10. The system of claim 8, wherein the depth processing unit is further configured to cull the pixel sample if the depth value of the pixel sample does not satisfy the second depth test.

11. The system of claim 8, further comprising a color processing unit in communication with the depth processing unit.

12. The system of claim 11, wherein the color processing unit is configured to perform color processing operations on the pixel sample if the depth value of the pixel sample satisfies the second depth test.

13. A non-transitory computer-readable medium having stored thereon instructions which, when executed, operate to process a pixel sample, the processing comprising:
   performing an initial depth test on a depth value of the pixel sample without updating the depth value of the pixel sample on a condition that the initial depth test is satisfied;
   continuing to pipeline the pixel sample if the initial depth test is satisfied;
   performing a subsequent depth test on the depth value of the pixel sample; and
   writing the depth value of the pixel sample to storage if the subsequent depth test is satisfied,
   wherein pipelining the pixel sample includes at least one of a pixel shader and color processing block.

14. The non-transitory computer-readable medium of claim 13, further comprising culling the pixel sample if the initial depth test is not satisfied.

15. The non-transitory computer-readable medium of claim 13, further comprising culling the pixel sample if the subsequent depth test is not satisfied.

16. The non-transitory computer-readable medium of claim 13, further comprising processing the pixel sample with texture operations if the initial depth test is satisfied.

17. The non-transitory computer-readable medium of claim 13, further comprising processing the pixel sample with color operations if the subsequent depth test is satisfied.

* * * * *